US007536243B2

(12) United States Patent
Kakizawa et al.

(10) Patent No.: US 7,536,243 B2

(45) Date of Patent: May 19, 2009

(54) REMOTE MANAGEMENT SYSTEM OF DYNAMIC STATE DATA OF WORK MACHINE

(75) Inventors: Yasuaki Kakizawa, Tokyo (JP); Hideo Yamada, Tokyo (JP); Tomoaki Ono, Tokyo (JP); Satoshi Fujii, Tokyo (JP); Masaharu Kamagata, Tokyo (JP)

(73) Assignee: Caterpillar Japan Ltd., Tokyo (JP)

( * ) Notice: Subject to any disclaimer, the term of this patent is extended or adjusted under 35 U.S.C. 154(b) by 428 days.

(21) Appl. No.: 11/453,824

(22) Filed: Jun. 16, 2006

(65) Prior Publication Data

US 2007/0067582 A1 Mar. 22, 2007

(30) Foreign Application Priority Data

Sep. 20, 2005 (JP) ............................ 2005-272195

(51) Int. Cl.
*G01M 17/00* (2006.01)

(52) U.S. Cl. ............................ 701/29; 701/33; 701/36; 711/154

(58) Field of Classification Search ..................... 701/3, 701/29, 32, 33, 36; 726/2, 3, 4; 707/9, 10; 711/154; 340/961
See application file for complete search history.

(56) References Cited

U.S. PATENT DOCUMENTS 7,100,195 B1 * 8/2006 Underwood .................. 726/2

FOREIGN PATENT DOCUMENTS

JP 3011256 12/1999
JP 3597772 9/2004

* cited by examiner

*Primary Examiner*—Gertrude Arthur Jeanglaud
(74) *Attorney, Agent, or Firm*—Jacobson Holman PLLC

(57) ABSTRACT

A remote management system including a work machine side dynamic state data management device, and a management section side management device for causing a communication unit capable of data transmission and reception to and from a communication unit on the work machine side to receive dynamic state data transmitted from at least the work machine side and at the same time, causing a control section to run a Web site capable of providing data only to a user permitted to access and reflecting arbitrary data out of the received dynamic state data in the Web site.

2 Claims, 6 Drawing Sheets

REMOTE MANAGEMENT SYSTEM OF DYNAMIC STATE DATA OF WORK MACHINE

BACKGROUND OF THE INVENTION

1. Field of the Invention

The present invention relates to a technique capable of acquiring dynamic state data of a work machine operating on site at a remote place.

2. Related Background of the Invention

Conventionally, there have been proposed and operated systems acquiring dynamic state data of a work machine operating on an operation site by making use of a communication line at a terminal in a maintenance center, an office or the like, being a remote place for convenience of a user of a work machine. The system disclosed in Japanese Patent No. 3011256 (Patent Document 1) being one of them is a system, in which, as shown in FIG. 5, data transmission and reception are performed between a management section 50 being a center, and each work machine 51 via a radio communication line, and the remote management section 50 acquires the dynamic state data of the work machine 51 on site. Further, this system is also adapted such that a terminal 52 of a client, who is the owner of the work machine 51, and a mobile terminal 53 of a serviceperson of a shop can access the work machine 51 to acquire the dynamic state data, as shown in FIG. 6.

Moreover, the Japanese Patent No. 3597772 (Patent Document 2) has proposed an anti-theft system causing a work machine to forcibly stop by transmitting a stop command of an engine from a management section when the work machine moves out of a predetermined region while applying the data transmission and reception of such a remote management system.

[Patent Document 1]

Japanese Patent No. 3011256 (paragraph 0028, FIG. 1, FIG. 7)

[Patent Document 2]

Japanese Patent No. 3597772 (paragraph 0008)

However, there is a problem in the system of the above Patent Document 1 that data cannot be received at a remote place while the engine of a work machine is at rest because a controller in charge of data transmission in each work machine basically has a mechanism of being interlocked with an engine key switch. Although the mechanism (referring to the paragraph 0028 in the Patent Document 1) is proposed, in which, by using a timer etc., transmission becomes possible while the timer is in operation by keeping the power supply for 5 to 10 minutes after the engine key switch is turned off, in most cases, the user desires the current position information and the latest dynamic state data even while the work machine is completely at rest, and such a recent desire cannot be satisfied at all.

Further, in the above Patent Document 2, there has taken place the case that when a work machine is stolen and taken out of a predetermined region with its engine at rest (for example, when it is conveyed on a truck etc.), the theft cannot be noticed by the management section side because no warning data is transmitted, and even when it is moved out of the predetermined region with engine operating, if the engine is stopped outside the predetermined region, the work machine cannot receive the stop command from the management section, and the function of anti-theft may not work.

Furthermore, in the system of the above Patent Document 1, as shown in FIG. 6, a client terminal 52 and also a serviceperson mobile terminal 53 can access the work machine 51 to acquire data, accordingly the work machine needs to prepare an authentication mechanism for plural connected parties, thereby making the processing complex and increasing a burden imposed by the security measures due to allowing plural accesses. Moreover, the burden of the running cost also increases in addition that the operation becomes unstable because of the complex mechanism of the system.

SUMMARY OF THE INVENTION

The present invention has been achieved in consideration of the above-mentioned problems in the conventional system, and an object of the present invention is to provide the technique capable of providing the latest data as much as possible when a user needs dynamic state data, of preventing leakage of data despite its simple system mechanism, and of performing data transmission and reception suited to the convenience of a user.

To this end, a remote management system according to the present invention is a remote management system for managing the dynamic state of a work machine at a remote management section by a communication unit, the system including: a work machine side dynamic state data management device, which obtains the power supply to operate the device directly from the battery of the work machine, and further causes a memory section of the communication unit to store the contact address data of the management section and causes the communication unit of its own to transmit dynamic state data only to the management section based on the contact address data, upon confirming arbitrary transmission start data set in advance by a control section of its own; and a management section side management device for causing the communication unit of its own capable of transmitting and receiving data to and from a communication unit on the work machine side to receive dynamic state data transmitted from at least the work machine side, causing the control section of its own to run a Web site capable of providing data only to a user permitted to access, and of reflecting arbitrary data out of the received dynamic state data in the Web site.

Here, the dynamic state data means all kinds of data relating to the state of a work machine and may be referred to as operating state data (hereinafter, also referred to as operation data in the present application), abnormal state data to be warned (hereinafter, also referred to as warning data in the present application), and the like, the way of its naming not specified in particular. The contact address data refers to the data of the communication destination to which dynamic state data can be transmitted, such as a telephone number, a mail address, etc., of the management section. The arbitrary transmission start data may be data in any form as long as the control section is able to confirm that it is stored at a predetermined place. Therefore, setting in advance means determining in advance a place in which the data to be confirmed by the control section is stored.

In the present invention, as transmission start data, for example, suppose that a call command signal (a telephone call or an e-mail will do) from the management section side is set and storing the signal in the storage section of the communication unit is set as a key for starting transmission. When trying to acquire the dynamic state data of a work machine, a user sends an acquisition request to the management section through the Web site, and upon receipt of this, if the management section transmits a call command signal to the work machine side via the communication unit, the work machine side dynamic state data management device stores the command signal in the storage section of the communication unit, therefore, after causing the communication unit to take out the contact address data from the storage section with storing of the data as a start key, the control section causes the management section side to access and transmit the requested dynamic state data. The management section side having received the dynamic state data provides the received data to the user who requested the data through the Web site. Since the work machine side dynamic state data management device in the system of the present invention obtains the power supply directly from the battery, even while the work machine is at rest, such data transmission and reception are made possible.

In the present invention, the work machine side dynamic state data management device obtains the power supply directly from the battery of the work machine, therefore, it operates even if the engine key switch is off as long as the main power supply is not turned off. Therefore, even when the work machine is not in operation, if the user desires dynamic state data, it is possible to acquire data through the management section. Of course, it is also possible for the work machine side to spontaneously transmit dynamic state data to the management section, therefore, it is made possible to transmit various dynamic state data while the work machine is at rest. This means that it is made possible to transmit warning data (for example, position data indicating that the position is outside a predetermined region) from the work machine side to the management section even in the case where a thief conveys the work machine on a truck etc., therefore, an anti-theft function is also effective.

Further, in a system according to the present invention, a transmission destination of dynamic state data from a work machine side is only a management section for which a contact address is set in advance, and data is provided to a user from the management section through the Web site, therefore, if the work machine side provides the dynamic state data only to the management section, it is made possible to provide the data to plural users. This makes it possible to considerably simplify the system because no authentication mechanism is necessary and to suppress a communication running cost to a very small one in comparison with a system in which plural users access directly and data is provided thereto.

Furthermore, data transmission and reception are performed only to and from the management section for which the contact address is determined in advance, therefore, the possibility of leakage of information is considerably reduced and the construction cost necessary for security is very low.

Further, since the management section side totally performs data transmission and reception to and from the work machine and reflects the received data in the Web site to provide it to a user, even though only raw data consisting, for example, only of numerical values is received from the work machine, it is possible to process the data into one in a form desired by the user for display when reflecting it in the Web site, hence the system affords the convenience to the user.

Further, since the management section side totally performs data transmission and reception, it is possible to selectively divide the operation data into two one of which is necessary for maintenance and management, and the other of which is necessary for a client, therefore, it is possible to provide only the data required for the client and only the data required for the shop serviceperson respectively.

Furthermore, it is also possible for the management section side to acquire collectively the operation data of all of the work machines at a fixed time (in this case, it is only necessary to issue a request command for the data of all of the work machines at a fixed time) and to reflect the data in the Web site, and in the case of such an aspect, the communication cost is considerably reduced.

DESCRIPTION OF THE PREFERRED EMBODIMENTS

There will be described specific embodiments of the present invention with reference to drawings.

Figure 1:
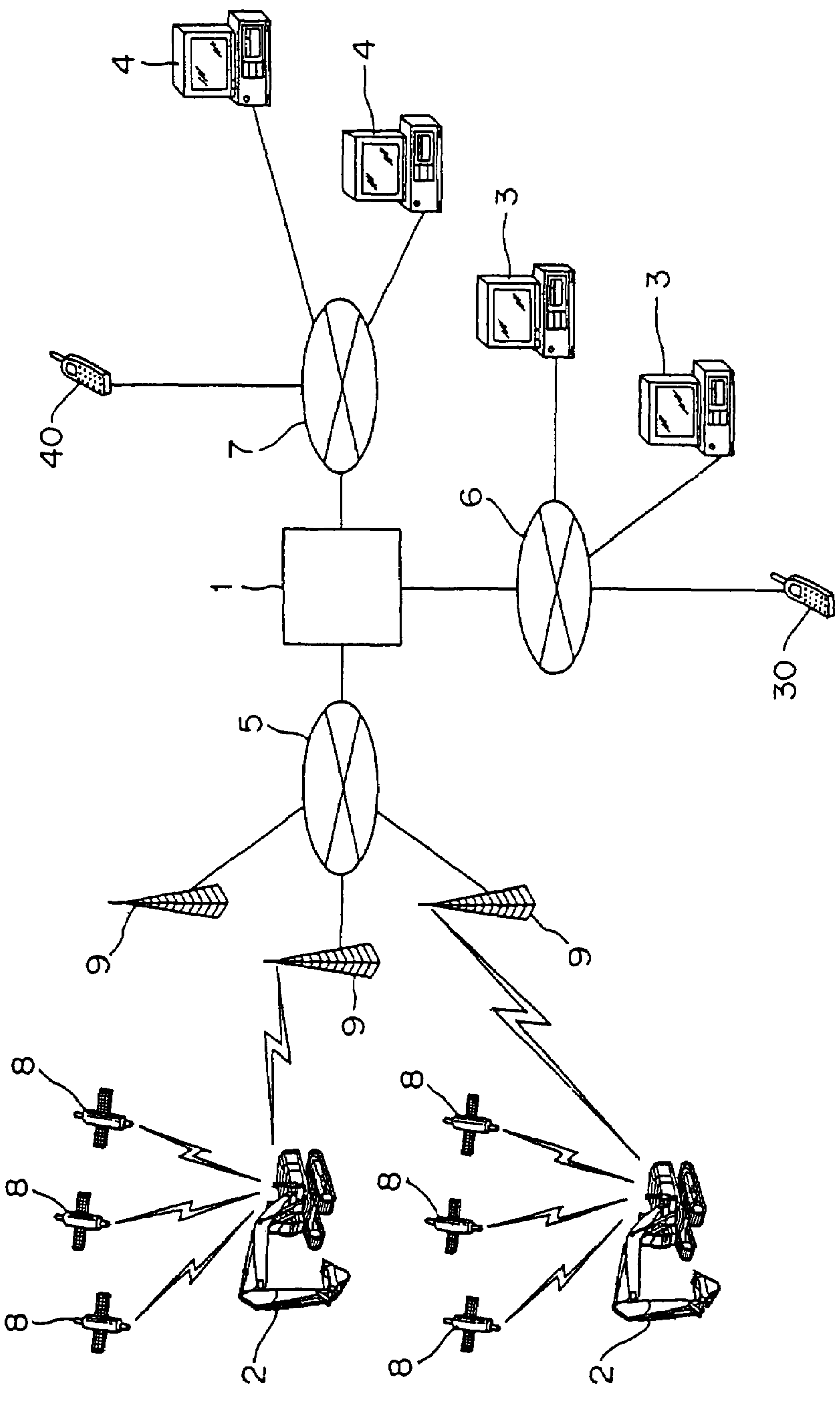
FIG. 1 is an illustrative diagram of an entire remote management system according to the present invention.

FIG. 1 is a configuration diagram showing an entire remote management system, and reference numeral 1 denotes a management section; 2, a work machine; 3, a client terminal; 4, a shop terminal; 5, a mobile telephone network; 6, an internet network; 7, an intranet network; 8, a GPS satellite; 9, a relay antenna; 30, a client mobile phone; and 40, a serviceperson mobile phone.

The management section 1 accomplishes the function as a center for running the present system, and in the present embodiment, a mode is adopted in which the maker of the work machine runs the system. Because of this, as described later, the management section 1 side and the shop terminal 4 (including the serviceperson mobile phone 40) are connected via the intranet network 7 of an affiliated group.

Figure 2:
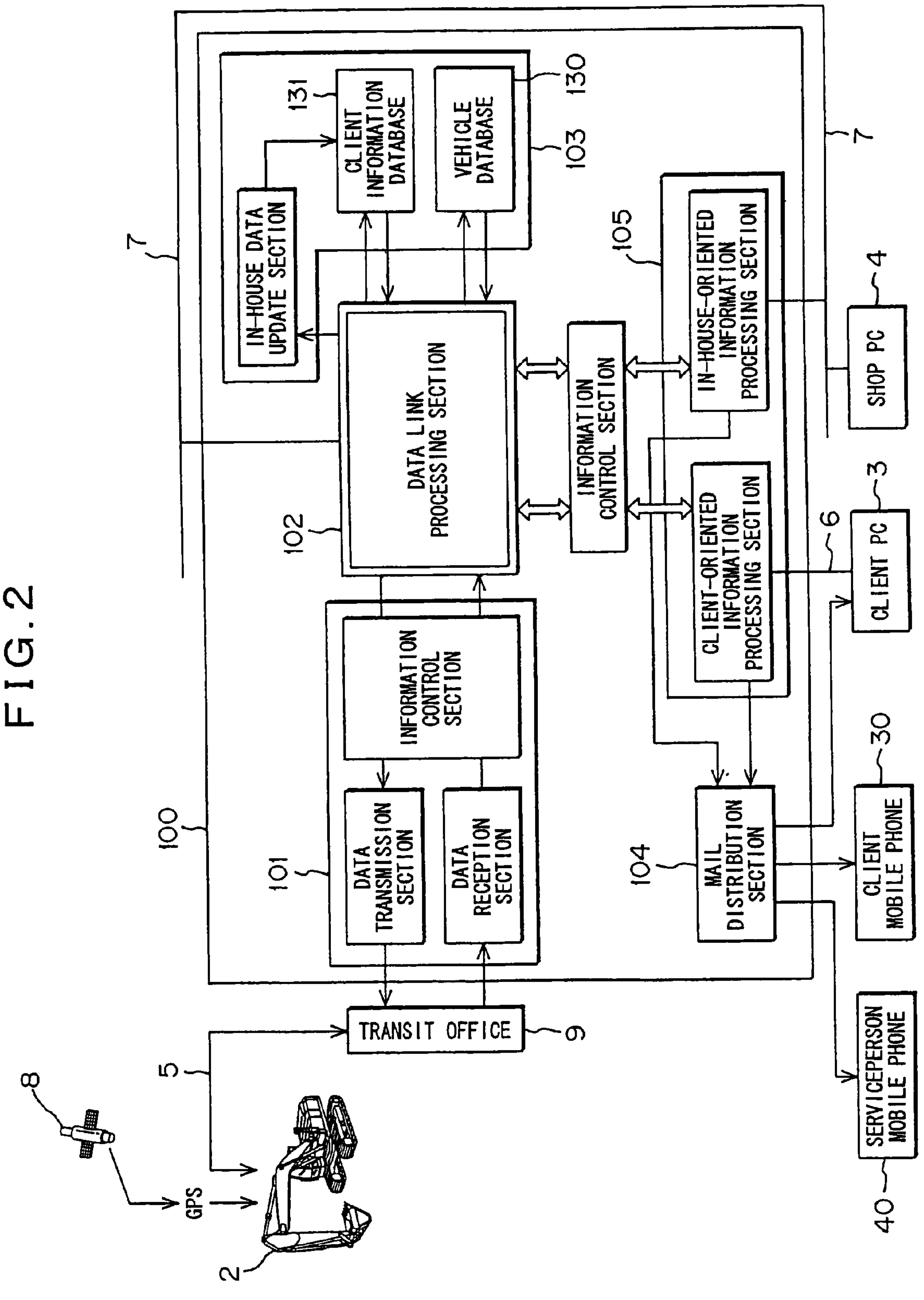
FIG. 2 is a device configuration diagram of a system control device in a management section.

As shown in FIG. 2, in the management section 1, a system control device 100 for performing management section side control of the remote management system is provided, and the control device 100 includes a communication section 101, a data link processing section 102, a database 103, a mail distribution section 104, and a network line information processing section 105 (this configuration will accomplish functions as explained below with the aid of a single or plural servers). The communication section 101 includes a communication device capable of making use of the mobile telephone network 5 and performs data communication with the work machine 2 side via the mobile telephone network 5. The data link processing section 102 controls data transmission and reception between the work machine 2 side and the client terminal 3 (including the mobile phone 30), which is a user, and between the work machine 2 side and the shop terminal 4 (including the serviceperson mobile phone 40), and includes a server for performing the processing. The database 103 is composed of a vehicle database 130 and a client information database 131, and the vehicle database 130 stores data transmitted from the work machine 2 side and the client information database 131 stores data about the clients sequentially updated by the client master via the company intranet network 7. In the Web site, which will be described later, information in each of the databases 130 and 131 is provided to a user with a string attached. The client information mail distribution section 104 is provided with a mail server for transmitting an e-mail to the effect that there has been warning data to the client mobile phone 30 and the serviceperson mobile phone 40 when the warning data is transmitted from the work machine 2 side, which will be described later. Because of this, the addresses of the client mobile phone 30 and the serviceperson mobile phone 40 to which transmission should be performed are stored in the memory of the mail distribution section 104. The network line information processing section 105 is provided with a Web server for managing the Web site, and performs data transmission and reception to and from the client terminal 3 and the shop terminal 4 through the Web site. In the present embodiment, a mode is adopted in which the client terminal 3 makes use of the internet network 6 and the shop terminal 4 makes use of the intranet line network 7, therefore, the Web server is provided with a gate for each line, and the routes for data transmission and reception are divided for each of the networks 6 and 7. Further, in order to allow acquisition request for predetermined data through the Web site, the Web site requires login with an ID and a password as its condition and therefore, a client and a serviceperson permitted to access are assigned with an ID and a password.

Figure 3:
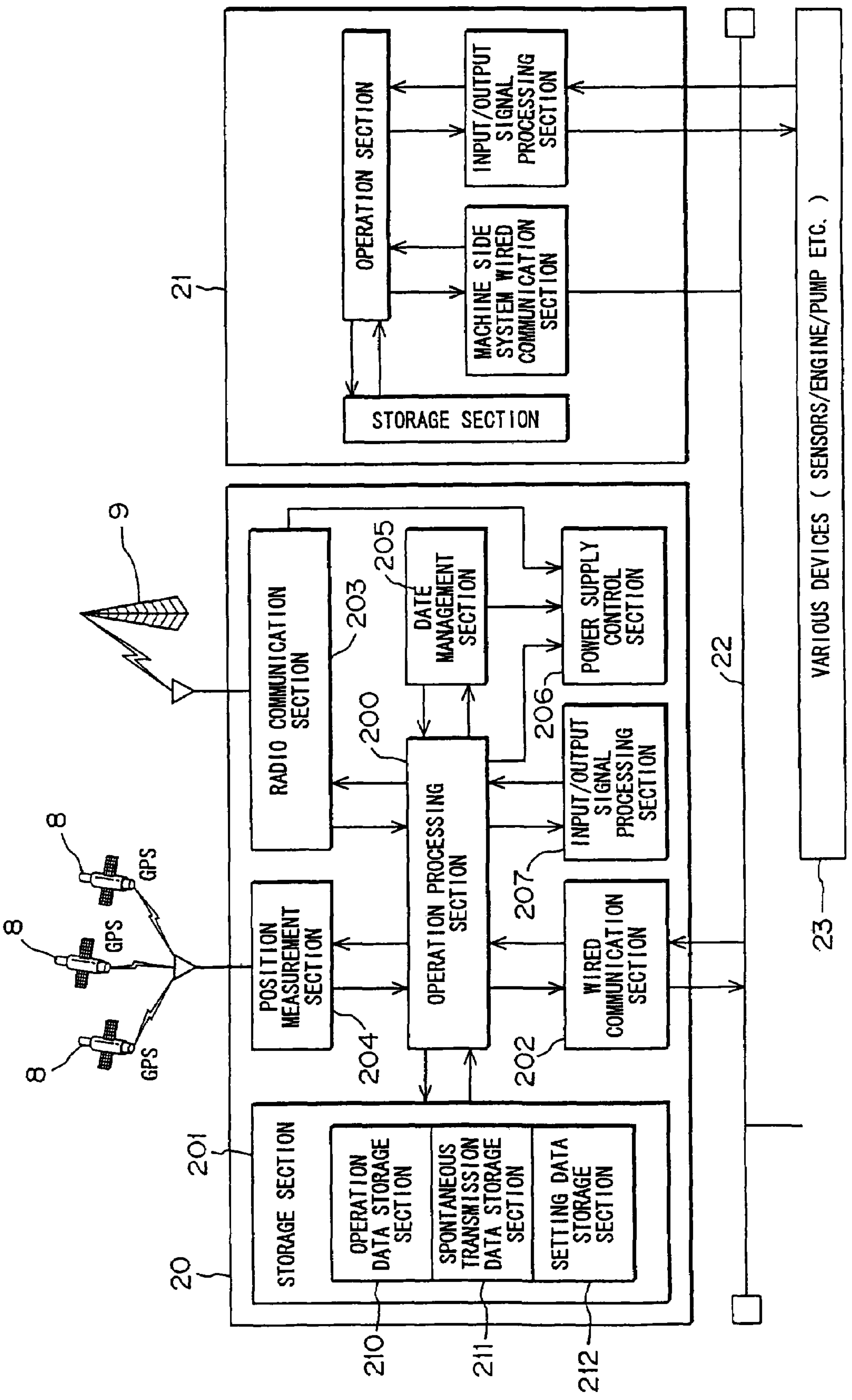
FIG. 3 is a system configuration diagram on a work machine side.

As shown in FIG. 3, the work machine 2 is provided with a dynamic state management controller 20, which is a dynamic state data management device, for controlling data transmission and reception between the inside and the outside of the machine. In an electric system of the present embodiment, a main power supply circuit to be directly connected to a battery (not shown) of the work machine 2 is provided, and the dynamic state management controller 20 and an engine start circuit are connected in parallel to the main power supply circuit. Therefore, even if the engine key switch is switched off, the dynamic state management controller 20 remains in an operating state as long as the main power supply switch (a disconnect switch) is not turned off. Additionally, the electric system described above may have any aspect as long as the dynamic state management controller 20 is connected directly to a battery and the on/off of the controller 20 is not linked with the on/off of the engine key switch.

Further, the work machine 2 is also provided with a vehicle control controller 21 for controlling various devices of a vehicle. The vehicle control controller 21 is connected to an engine key switch circuit, different from the dynamic state management controller 20, and work with the on/off of the key switch. The vehicle control controller 21 is connected to various devices 23 (engine, pump, sensors, etc.), takes out predetermined operation data therefrom, and stores them in an internal storage section. The dynamic state management controller 20 is connected to the vehicle control controller 21 via a vehicle-mounted network 22, and the operation data taken in by the vehicle control controller 21 is taken in by the dynamic state management controller 20 via the network 22 (specifically, the data is taken in from a wired communication section 202 and stored in an operation data storage section 210, which will be described later). Additionally, some machine types may have an aspect in which the vehicle control controller 21 is not provided and in the case of such an aspect, the various devices 23 may be connected to the dynamic state management controller 20 (in FIG. 3, an input/output signal processing section 207) to directly take in the operation data.

The dynamic state management controller 20 includes an operation processing section 200, which serves as a main control section, a storage section 201, the wired communication section 202, a radio communication section 203, a position measurement section 204, a date management section 205, a power supply control section 206, and the input/output signal processing section 207. The operation processing section 200 outputs a command as to data transmission and reception etc. in the controller 20 to each of the constituent sections 201 to 206. The storage section 201 stores the operation data and warning data of the work machine, and the setting data describing conditions, which will be the command reference of the operation processing section. In the present embodiment, a memory is supposed as the storage section 201, however, other storage devices will do. In the storage section 201, its storage region is divided into three sections: the operation data storage section 210, a spontaneous transmission data storage section 211, and a setting data storage section 212, depending on the data stored therein. The wired communication section 202 performs data communication with the other controller (in the present embodiment, the vehicle control controller 21) via the vehicle-mounted wired network 22. The radio communication section 203 is provided with a radio communication device and a memory capable of making use of the mobile telephone network 5 and performs data communication with the communication section 101 of the management section 1 via the mobile telephone network 5. In the memory, the telephone number (contact address data) of the communication section 101 of the management section 1 and, in addition, a region for storing the calling e-mail from the communication section 101 is set. The position measurement section 204 is provided with a GPS receiver and receives radio waves from the GPS satellites 8 and positions the current position. The date management section 205 is provided with a timer unit and a charging battery and keeps the date even when the main power supply is off to manage the date data and outputs it to the operation processing section 200 when a date/time set in advance by the operation processing section 200 is reached. The power supply control section 206 controls the on/off of the internal power supply.

Storing of each data to the storage section 201 is processed by a command from the operation processing section 200 and among it, the operation data is stored in the operation data storage section 210 from the vehicle control controller 21 via the vehicle-mounted network 22. If there is abnormal data that meets the condition to issue warning among the operation data, it is stored also in the spontaneous transmission data storage section 211 as warning data. When warning data is stored in the spontaneous transmission data storage section 211, as described later, regardless of the presence/absence of a calling e-mail from the management section 1, the operation processing section 200 issues a command to cause the management section 1 side to transmit the warning data. The control command of the operation processing section 200 is based on the setting data stored in the setting data storage section 212 of the storage section 201, and the setting data to be updated is transmitted from the management section 1 side and stored in the setting data storage section 212.

Figure 4:
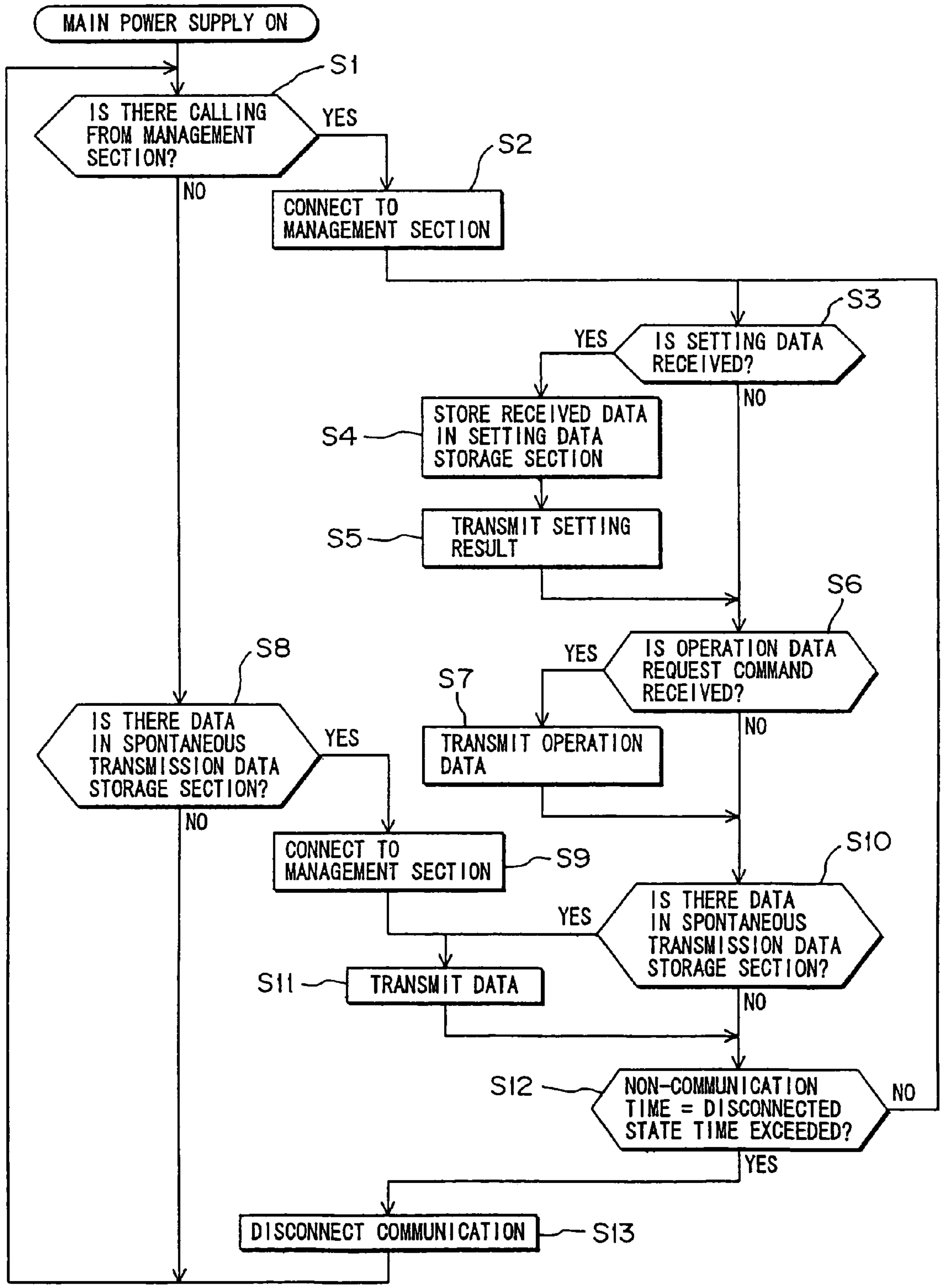
FIG. 4 is a flow chart of communication processing in a dynamic state management controller.
Figure 5:
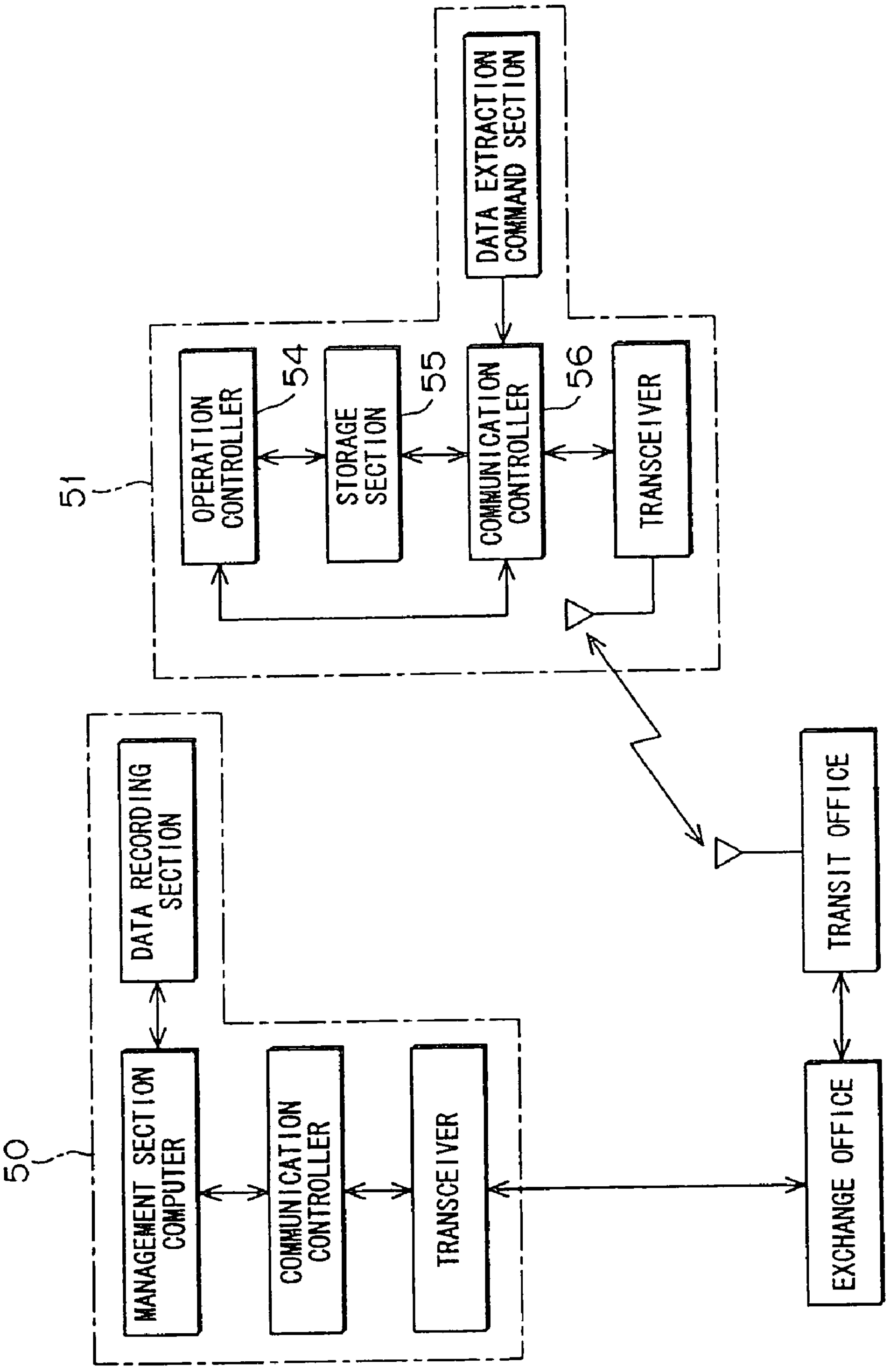
FIG. 5 (PRIOR ART)
FIG. 5 is a configuration diagram of a remote management system disclosed in the Japanese Patent No. 3011256.
Figure 6:
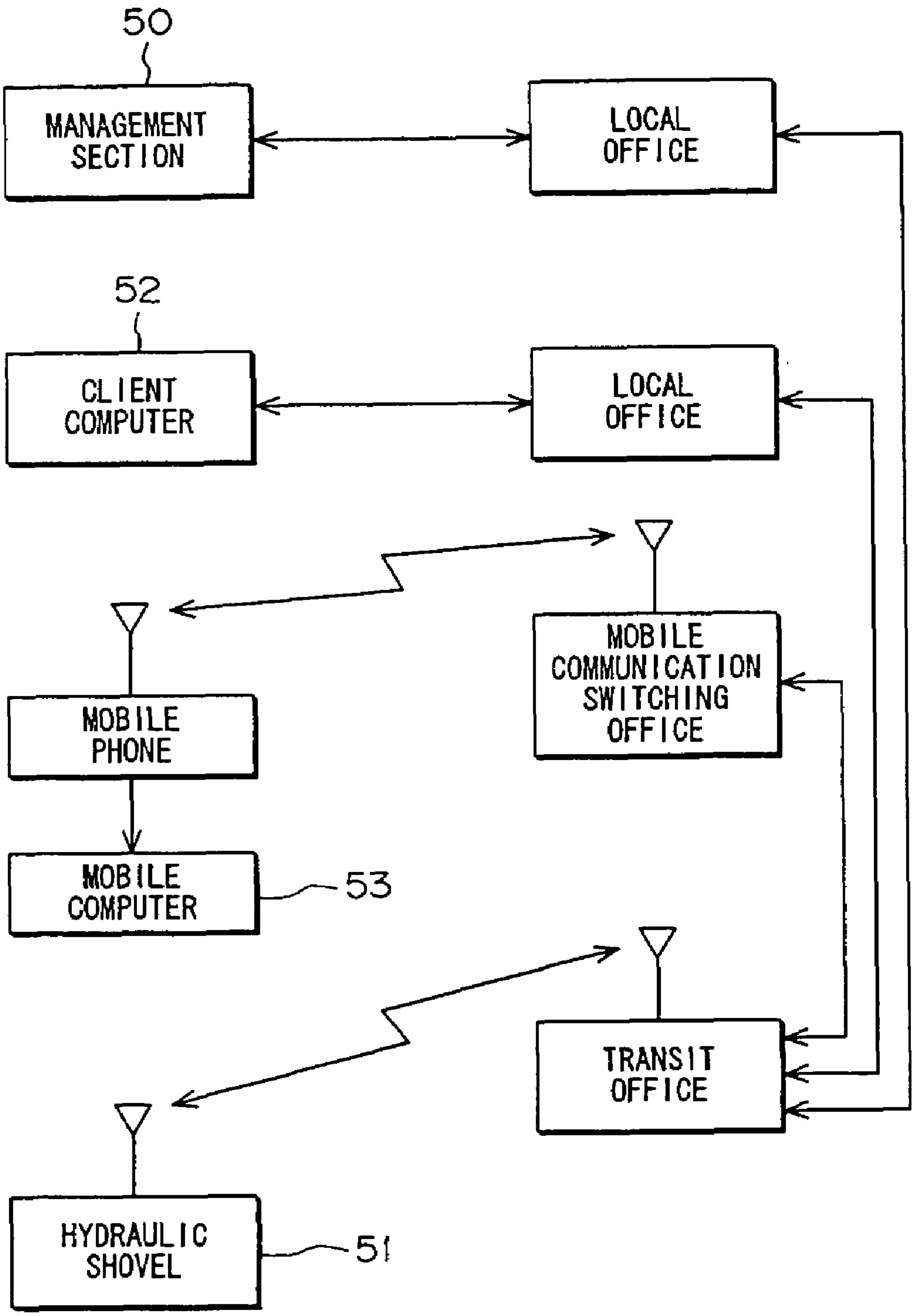
FIG. 6 (PRIOR ART)
FIG. 6 is another configuration diagram of the remote management system disclosed in Japanese Patent No. 3011256.

Next, there will be described communication processing in the dynamic state management controller 20 with reference to FIG. 4.

The operation processing section 200 always checks whether or not a calling e-mail from the communication section 101 of the management section 1 is received and stored in the memory as long as the main power supply switch remains on (the loop S1 to S8). When a calling e-mail is transmitted, it is received by the radio communication section 203 and immediately stored in the memory of its own. If the operation processing section 200, which is checking, confirms that it is stored (S1), it causes the radio communication section 203 to take out the telephone number of the communication section 101 of the management section 1 from the memory of its own and causes the management section 1 side to make a call (S2). When the radio communication section 203 establishes communication with the communication section 101 of the management section 1, if there is setting data from the communication section 101 of the management section 1, it is transmitted and at the same time, a transmission request for the desired work machine 2 is transmitted. The operation processing section 200 first confirms whether the setting data has been received (S3) and if received, stores and updates the data in the setting data storage section 212 of the storage section 201 (S4) and returns the update-completed result to the management section 1 side as data. (S5). The setting data is a control command of the operation processing section 200, as described above, and after the update, the control is performed based on the setting after the update. Next, the operation processing section 200 confirms the operation data request (S6), takes out the operation data of the desired work machine 2 from the operation data storage section 210, and causes the radio communication section 203 to transmit it to the communication section 101 of the management section 1 (S7: additionally, the management section 1 side having received the operation data reflects the data in the Web site and provides the user with the information). Next, the operation processing section 200 confirms the presence/absence of the warning data within the spontaneous transmission data storage section 211 of the storage section 201 (S10), and if the warning data is present, takes out the data and causes the radio communication section 203 to transmit it to the communication section 101 of the management section 1 (S11: the management section 1 side having received the warning data reflects the data in the Web site and at the same time, transmits an e-mail to the effect that the warning data is received to the mobile phones 30 and 40 of the users registered in the management section 1 side). The operation processing section 200 forcibly disconnects the line when a predetermined time elapses after each data transmission (S12, S13). Additionally, when there is no calling e-mail from the communication section 101 of the management section 1, the operation processing section 200 always checks whether or not the warning data is present within the spontaneous transmission data storage section 211 of the storage section 201 (S8) and if data is present, causes the radio communication section 203 to make a call to the communication section 101 of the management section 1 (S9) to transmit the warning data (S1). The following processing is the same as that described above (S12, S13).

Both the client terminal 3 and the client mobile phone 30 premise that they are in an environment in which the Web site run by the management section 1 can be accessed via the internet network 6. Further, the client mobile phone 30 has a function of receiving and storing an e-mail.

Both the shop terminal 4 and the serviceperson mobile phone 40 premise that they are in an environment in which the Web site run by the management section 1 can be accessed via the intranet network 7 of the maker affiliated group. Further, the serviceperson mobile phone 40 has a function of receiving and storing an e-mail.

Next, there will be described an actual data flow including the users of the remote management system configured as described above.

When a client, who is a user, or a shop serviceperson wants to know the current operation situation of the work machine 2 of his/her own, he/she accesses the Web site run by the management section 1 from the client terminal 3 or the shop terminal 4 of his/her own, respectively, via the internet network 6 or the intranet network 7 and requests acquisition of the operation data of the desired work machine 2 after logging in with his/her ID and password. The management section 1 side acquires access data to the requested desired work machine 2 from the database 103 of its own and transmits a calling e-mail to the desired work machine 2 via the mobile-telephone network 5 based on the data. The work machine 2 side receives in advance the calling e-mail with the radio communication section 203 of the dynamic state management controller 20. When confirming that the calling e-mail is in storage, the operation processing section 200 of the controller 20 outputs a call command to the radio communication section 203, and causes the section 203 to make a call to the management section 1 side via the mobile telephone communication network 5. The management section 1 side having received the call outputs a request signal for the operation data and on the work machine 2 side, upon receipt of it, the operation processing section 200 acquires the desired operation data from the storage section 201 in the controller 20, and causes the radio communication section 203 to output it. The management section 1 side having received this data once stores it in database 103 of its own and reflects it in the Web site of its own in a predetermined output form. Due to this, the desired operation data at that point is displayed on the client terminal 3 or the shop terminal 4.

In this flow, the dynamic state management controller 20 of the work machine 2 remains in operation even when the engine key switch is off and in an attitude to always monitor a calling e-mail from the management section 1 side for response, therefore, as long as the main power supply switch is not turned off, it is always possible for a client, who is a user, or a shop serviceperson to request and acquire the real-time operation data of the desired work machine 2 through the Web site run by the management section 1. Further, as for the warning data, if stored in the spontaneous transmission data storage section 211, as long as the main power supply switch is on, it is immediately transmitted from the work machine 2 side to the management section 1 side and the client and the serviceperson are notified of that by an e-mail, and therefore it can be known real-time that the work machine 2 is abnormal. Particularly, if it is adapted such that when the work machine 2 moves out of a supposed region, the position information is stored as warning data by making use of the GPS position information, it is made possible for a user at a remote place to immediately judge whether or not it is a theft. Additionally, in the case of the dynamic state data from which it is possible to suppose that the possibility of theft is obviously high, by providing a start control mechanism for shutting off the engine start circuit etc. with the dynamic state management controller 20 itself, anti-theft can be thorough and the configuration will become more useful.

Further, all of the requests for the operation data from the client terminal 3 or the shop terminal 4 pass through a route leading to the management section 1 and due to this, the destination to which the work machine 2 transmits the operation data is only the management section 1, and the start of the data transmission is restricted only by the presence/absence of a calling e-mail from the management section 1 side, therefore, an authentication mechanism for a user to whom the data is delivered is completely no longer necessary for the work machine 2 and furthermore, a process is such that instead of delivering data when there is an access, the data is transmitted only to the management section 1 to which the connection destination is set after calling is ended just as calling and making a call from the work machine 2 side, therefore, there is no possibility of data leakage despite the simple system mechanism of both the work machine 2 and the management section 1.

Further, since the system is configured such that the management section 1 side totally performs data transmission and reception to and from the work machine 2, and the received data is reflected in the Web site and then provided to a user, the system offers the convenience to a user because the raw data consisting of only numerical values from the work machine 2 is converted into data in a form desired by the user for display.

Further, since the management section 1 side totally performs data transmission and reception, the operation data can be selectively divided into two one of which is necessary for maintenance and management and the other of which is necessary for a client, therefore, it is possible to provide only the data necessary for a client and a shop serviceperson, respectively.

Furthermore, it is also possible for the management section 1 side to acquire collectively the operation data of all of the work machines at a fixed time (a request command for the data of all of the work machines is issued at a fixed time) and reflect the data in the Web site, and in the case of such an aspect, the communication cost is considerably reduced.

The present invention is a technique capable of being applied when the operation state of a work machine is managed remotely.

EXPLANATIONS OF NUMERALS

1 Management section
2 Work machine
3 Client terminal
4 Shop terminal
5 Mobile telephone network
6 Internet network
7 Intranet network
8 GPS satellite
9 Relay antenna
20 Dynamic state management controller (Work machine side dynamic state data management device)
30 Client mobile phone
40 Serviceperson mobile phone
203 Radio communication section (Work machine side communication unit)

What is claimed is:

1. A remote management system for managing a dynamic state of a work machine at a remote management section by a communication unit, said system comprising:

a work machine side dynamic state data management device, which directly obtains a power supply to operate the device from a battery of the work machine, causes a memory section of the communication unit to store a contact address data of the management section, and causes the communication unit of its own to transmit dynamic state data only to said management section based on said contact address data, upon confirming arbitrary transmission start data set in advance by a control section of its own; and a management section side management device for causing the communication unit of its own capable of data transmission and reception to and from a communication unit on said work machine side to receive dynamic state data transmitted from at least the work machine side, and, at the same time, causing the control section of its own to run a Web site capable of providing data only to a user permitted to access and reflecting arbitrary data out of said received dynamic state data in the Web site.

2. The remote management system for managing a dynamic state of a work machine at a remote management section by a communication unit according to claim 1, wherein, the control section of the management section side management device causes the communication unit to transmit a call command signal, which becomes transmission start data, when there is a request for the dynamic state data through the Web site from a user permitted to access; and wherein, the control section of the work machine side dynamic state data management device causes the communication unit of its own to transmit the dynamic state data to said management section based on the stored contact address data when the communication unit of its own confirms that said call command signal has been received.

* * * * *